(12) United States Patent
Kacines

(10) Patent No.: US 12,376,533 B2
(45) Date of Patent: Aug. 5, 2025

(54) ADJUSTABLE HEIGHT TOPIARY

(71) Applicant: Jeffery J. Kacines, Allen, TX (US)

(72) Inventor: Jeffery J. Kacines, Allen, TX (US)

( * ) Notice: Subject to any disclaimer, the term of this patent is extended or adjusted under 35 U.S.C. 154(b) by 0 days.

(21) Appl. No.: 18/111,054

(22) Filed: Feb. 17, 2023

(65) Prior Publication Data

US 2023/0200306 A1    Jun. 29, 2023

(51) Int. Cl.
*A01G 9/12* (2006.01)
*A41G 1/00* (2006.01)

(52) U.S. Cl.
CPC ............. *A01G 9/12* (2013.01); *A41G 1/001* (2013.01); *A41G 1/007* (2013.01)

(58) Field of Classification Search
CPC ........... A01G 9/12; A41G 1/001; A41G 1/007
USPC .......................................................... 428/15
See application file for complete search history.

(56) References Cited

U.S. PATENT DOCUMENTS

| | | |
|---|---|---|
| 2004/0088915 A1 | 5/2004 | Power |
| 2004/0245762 A1 | 12/2004 | Joseph et al. |
| 2005/0072748 A1 | 4/2005 | Shai |
| 2008/0169254 A1 | 7/2008 | Govrik |
| 2009/0230259 A1 | 9/2009 | Mead |
| 2015/0003884 A1 | 1/2015 | Kast |
| 2015/0217320 A1 | 8/2015 | Bonzer |
| 2016/0174706 A1 | 6/2016 | Volin |
| 2016/0324081 A1 | 11/2016 | Johnson |

FOREIGN PATENT DOCUMENTS

DE          1976846 U   *   1/1968

OTHER PUBLICATIONS

Woessner, Google Patents Machine Translation printed on Oct. 3, 2024 of DE1976846U, Jan. 11, 1968, entire translation (Year: 1968).*

* cited by examiner

*Primary Examiner* — Katherine A Christy
(74) *Attorney, Agent, or Firm* — Roger N. Chauza, PC

(57) ABSTRACT

A topiary arrangement with foliage tiers having stems that are telescopic with respect to each other in order to achieve desired spacings between the foliage tiers. Each foliage tier includes a spherical foliage bundle with a tubular stem extending downwardly therefrom. Successive tiers of the foliage tiers have tubular stems that are somewhat different in diameters so that the stems are telescopic with respect to neighbor stems. A respective O-ring is stretched around the foliage stem to function as an adjustment mechanism to space the tiers from each other a desired distance. When one tubing stem is inserted into an underlying tubing stem, the O-ring on the upper tubing stem can be adjusted thereon so that the tubular stem telescopes downwardly only a desired distance within the underlying tubing stem, thus making the foliage tiers individually adjustable as to spacing therebetween.

16 Claims, 3 Drawing Sheets

ADJUSTABLE HEIGHT TOPIARY

TECHNICAL FIELD OF THE INVENTION

The present invention relates in general to stacked or tiered decorative items, and more particularly to methods and apparatus for fabricating a multi-tiered topiary for shipping and display.

BACKGROUND OF THE INVENTION

Many items are constructed so as to be extendible in length to fulfill different needs. Umbrellas, for example, are extendable so that when in a compact form they are easily carried and stored, but when extended can elevate the canopy well above the user's head. Canes and crutches are extendable so as to be adjustable to the user's height. Shade canopies are often equipped with extendable legs to adjust the height of the shade canopy to accommodate persons of different heights.

The adjustment of the foregoing mechanisms is often accomplished using telescopic members to allow the members to be adjusted to different lengths. One member can be constructed with a number of holes along the length thereof, and the other telescopic member can be constructed with a button tab that is spring loaded and is insertable into any one of the holes. Depending on which hole the button tab is allowed to be engaged therein, the length of the telescopic mechanism is determined. Depending on the spacing between the holes, the members are telescopic in length accordingly. Other telescopic members, such a swimming pool poles with nets at the end thereof, require a twisting motion between the members to loosen and tighten the members and allow telescopic adjustment. The prior art is replete with many other examples of telescopic members that are adjustable to different lengths.

From the foregoing, it can be seen that a need exists for an item that is adjustable to an infinite number of gradations of length. There is a further need for a cost effective adjustment mechanism that is not complex in structure or operation.

SUMMARY OF THE INVENTION

In accordance with the principles and concepts of the invention, and in its simplest form, disclosed is a topiary arrangement that has multiple tiers, where each tier is telescopically adjustable in length.

Another feature of the invention is that each foliage tier is adjustable in length by using telescopic tubular stem members, and an O-ring to limit the telescopic movement of one tubular stem member with respect to another tubular stem member, in one direction. Thus, when the topiary arrangement is positioned upright, the tubular stems will not telescopically collapse, but the respective O-rings of each tier will function to limit the downward movement of the respective foliage tier.

A further feature of the invention is that by simply pushing down on the top foliage tier, all the underlying tiers will telescopically collapse into a compact volume. As such, the compact topiary arrangement can be economically shipped or easily stored.

An additional feature of the topiary arrangement of the invention is that by utilizing telescopic tubular stems, and associated O-rings, each tier can be adjusted in an infinite number of increments to achieve the desired length. The individual tiers can thus be adjusted to different lengths, as desired.

An aspect of the invention is that by utilizing round tubular stems as telescopic members, each tier can be rotated to desired rotational orientations. Thus, if a foliage tier has a face surface that is damaged or discolored, that foliage tier can be rotated to present a better orientation.

An additional aspect of the invention is that the foliage tiers can be separated from each other by simply lifting the top foliage tier to remove the telescopic connection to the underlying tier, and so on for each foliage tier until the entire topiary arrangement is disassembled. Similarly, if a damaged tier requires replacement, then the removal of the damaged foliage tier can be easily removed and replaced.

In accordance with an embodiment of the invention, disclosed is a topiary arrangement which includes a first and a second vertical tier, where the tiers include respective first and second decorative items. Further included is a base for supporting the vertical tiers. The first tier has a first tubular member with a first diameter, where the first tubular member includes a top end with an edge, and the first tubular member is attached to the first decorative item. Further included is a second tier having a second tubular member with a diameter that is different from the diameter of the first tubular member so that the first and second tubular members are telescopic in length. The second tubular member has a top end with an edge. An O-ring tightly engages around the tubular member with a smaller diameter. The O-ring is for engaging the edge of the tubular member with a larger diameter, and the O-ring is for limiting telescopic movement between the first and second tubular members.

According to another embodiment of the invention, disclosed is a topiary arrangement that includes one or more tiers of topiary items, where each topiary tier is adapted for being arranged vertically with respect to each other. Each topiary tier has a stem that is adjustably attached to the stem of an underlying topiary tier so that the attached stems can be lengthened and shortened to thereby individually adjust a distance between each topiary tier. A base is included to which a stem of a bottommost topiary tier is attached, where the stem of bottommost topiary tier is adjustable in length with respect to the base.

With regard to a further embodiment of the invention, disclosed is a method of adjusting a position of a topiary tier of a topiary arrangement. The method includes inserting a first tubular stem depending from a first topiary tier down into a second tubular stem exposed in a top of a second topiary tier that underlies the first topiary tier. The first tubular stem is telescoped within the second tubular stem until a desired distance exists between the first topiary tier and the second topiary tier. An O-ring is moved along the first tubular stem downwardly until the O-ring engages a top edge of the second tubular stem to thereby limit the downward movement of the first tubular stem with respect to the second tubular stem. The first topiary tier is thus spaced from the second topiary tier a desired distance.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
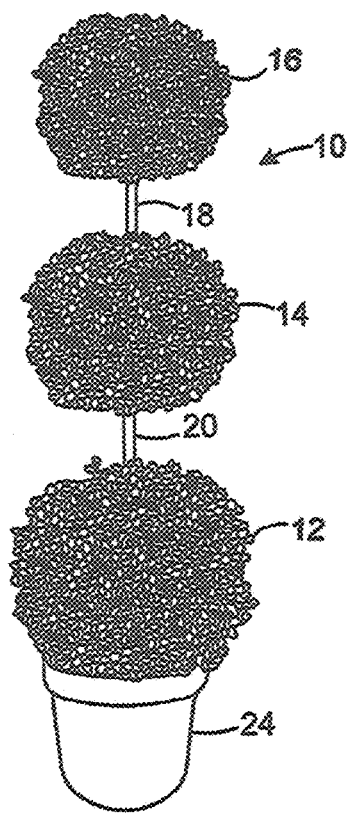
FIG. 1 is a side view of a three tier topiary with the parts or tiers telescopic in length to separate the tiers a desired distance.
Figure 2:
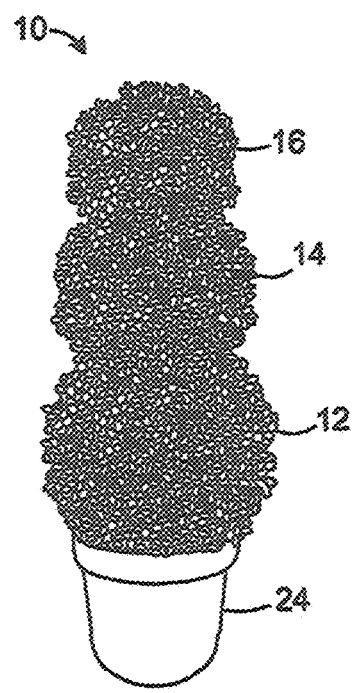
FIG. 2 is a side view of the topiary arrangement of FIG. 1, but the stems are telescoped into a compact arrangement.

FIG. 1 illustrates a three tier topiary arrangement 10 constructed according to an embodiment of the invention. The topiary arrangement 10 is constructed with three sections or tiers 12, 14 and 16 of globe-shaped artificial greenery, such as leaf or foliage structures. While not necessary, the bottom tier 12 is larger in diameter than the middle tier 14, and similarly, the middle tier 14 is larger in diameter than the top tier 16. The top tier 16 is connected to the middle tier 14 with a telescopic stem 18, and the middle tier 14 is connected to the bottom tier 12 with a similarly-constructed telescopic stem 20. The bottom tier 12 is connected to an urn, bucket or container 24 with a similarly-constructed telescopic stem 22 (shown in FIG. 3). The telescopic stems 18, 20 and 22 are illustrated as being extended, but can be fully contracted as shown in FIG. 2. When fully contracted, the telescopic stems 18, 20 and 22 may not be visible, and thus the topiary arrangement 10 is more compact for shipping, storage or during use. The bottom telescopic stem 22 can be anchored in a decorative urn or container 24 which is weighted to prevent inadvertent overturning. The urn 24 can be constructed with a heavy material itself, or a heavy material such as rocks can be added to the bottom of the urn 24.

After the topiary arrangement 10 is fabricated, it can be placed in the compact position, as illustrated in FIG. 2, so that a smaller container is required for shipping. Shipping costs are thus reduced. In addition, the user can place the topiary arrangement 10 in the compact position during outdoor use to minimize the size thereof so that it is less susceptible to be blown over during windy days. Lastly, the topiary arrangement 10 can be placed in the compact position by the user for storage to thereby minimize the storage space required.

As will be described in more detail below, the topiary arrangement 10 can be collapsed into a compact volume by simply pushing down on the top tier 16 of FIG. 3 so that the top telescopic stem 18 slides down into the middle topiary tier 14, and upon further downwardly pushing, the lower telescopic stem 20 collapses and slides down into the bottom topiary tier 12. Lastly, upon further downward pushing of the top topiary tier 16, the bottom telescopic stem 22 slides down into a base tubular member 26 which is anchored in the urn 24. In the compact position, the three tiers 12, 14 and 16 are thus all vertically adjacent to each other and the telescopic stems 18, 20 and 22 need not be visible.

Figure 3:
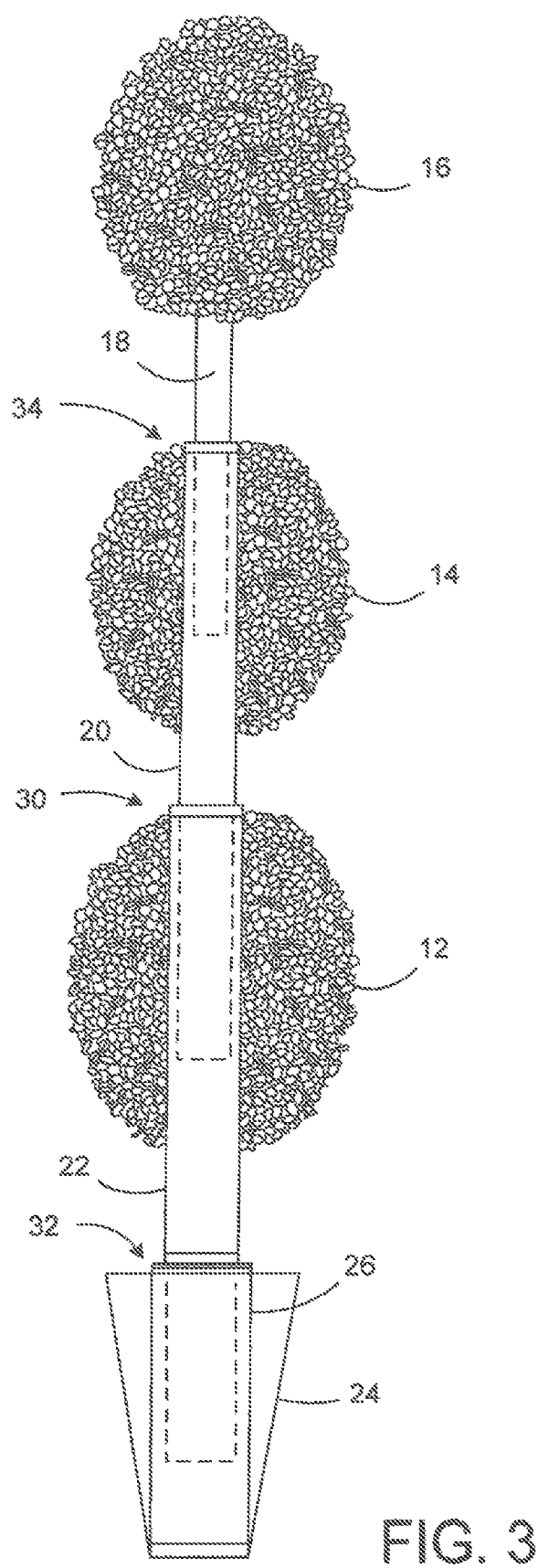
FIG. 3 is a side view of the topiary arrangement of FIG. 1, showing the tiers with extended telescopic connections therebetween.
Figure 4:
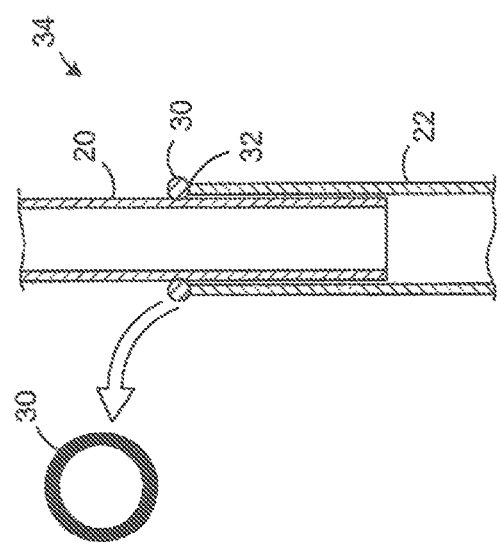
FIG. 4 is a side sectional view of a telescopic connection connecting the tiers of the topiary arrangement together.

With reference yet to FIGS. 3 and 4, there is illustrated the details in which the various tiers 12, 14 and 16 are telescopically connected together. FIG. 4 illustrates the telescopic connection 34 between the tiers. The telescopic connection 34 constitutes a lower tubular member 22 having a first diameter, a second upper tubular member 20 having a smaller diameter, and an O-ring 30 annularly engaged around the smaller diameter stem 20, where the O-ring abuts against an annular end edge 32 of the lower larger diameter stem 22. Here, the telescopic connection 34 of tubular stems 20 and 22 is illustrated, it being understood the other telescopic stems include the same construction. For purposes of cost, the stem members 20 and 22 are both tubular and constructed of PVC tubing. Many other types of synthetic, wood or metallic tubing can be used with equal effectiveness. The upper tubular stem 20 is smaller in diameter than the lower tubular stem 22 into which it telescopically slides. In the preferred embodiment, the lower PVC tubular stem is of a diameter of about one inch. The upper tubular stems are successively smaller in diameters so that the upper tubular stem slides down into the lower tubular stem. While not shown, the uppermost tubular stem 18 can be capped on its top end thereof with a cap or stopper. In addition, the top edge of a tubular stem could be an annular flange to increase the surface area with which the O-ring engages.

In accordance with an important feature of the invention, the tubular stems are each adjustable telescopically in an infinite number of locations by the use of an O-ring 30 that fits tightly around the upper tubular stem 20. With this arrangement, the O-ring 30 can be manually moved up or down on the upper tubular stem 20 so that when the upper tubular stem 20 is pushed down, the O-ring 30 engages with the top annular edge 32 of the lower tubular stem 22. The friction fit between the O-ring 30 and the upper tubular stem 20 is sufficient to prevent the weight of the upper tiers from inadvertently causing telescopic movement between the tubular stems 20 and 22. If the user desires that the spacing between the tiers 12 and 14 should be changed, then the user simply pushes or rolls the O-ring to a new position on the upper tubular stem 20. Each tier of the topiary arrangement 10 is individually adjustable using respective O-rings.

As can be seen from FIG. 3, the lower tubing stem 22 is a given diameter, the middle tubing stem 20 is of a smaller diameter than the lower tubing stem 22 so that it can slide therein, and lastly, the upper tubing stem 18 is smaller in diameter than the middle tubing stem 20 so that it can slide therein. As such, the lower O-ring 32 is larger in diameter than the middle O-ring 30, and the middle O-ring 30 is larger in diameter than the upper O-ring 34. The O-rings 32, 30 and 34 fit tightly onto the respective tubing stems 22, 20 and 18. Stated another way, the O-rings will need to be stretched somewhat when applying them to their respective tubing stems.

As can be appreciated, the user of the topiary arrangement 10 can easily space the foliage tiers apart from each other at different distances by the simple placement of the O-rings at different locations on their respective tubing stems. It might be desired to make the spacing between the lower tubing stem 22 and the urn 24 smaller than the spacing between the lower foliage tier 12 and the middle foliage tier 14. Similarly, it might be desired to make the spacing between the middle foliage tier 14 and upper foliage tier 16 smaller than the spacing between the middle foliage tier 14 and the bottom foliage tier 12.

If it is desired to make the spacing between the foliage tiers 12, 14 and 16 smaller, then the user simply pushes down on the overlying foliage tier so that the underlying tubing stem telescopes into the respective underlying tubing stem, where by the O-ring automatically moves up on the tubing stem around which it is stretched. The annular edge of the lower tubing stem is effective to push up on the O-ring and move it upwardly on its tubing stem. It can be appreciated that the downward force on the foliage tier overcomes the force of the O-ring stretched around the tubing stem, whereby the O-ring will be forced upwardly on its stem. When it is desired to make the distance between the foliage tiers 12, 14 and 16 larger, then the user simply lifts up on the upper foliage tier to cause its associated tubing stem to move telescopically upwardly out of the lower tubing stem. Then, the user must manually move the O-ring down on its tubing stem until it engages with the top annular end edge of the lower tubing stem. These are simple and easy steps to adjust the topiary tiers to the desired positions. In the preferred embodiment, the tubing stems are of lengths so that the spacings between the foliage tiers can be adjusted between about 0 inches and 8 inches. For purposes of stability, the smaller tubing stems should have a length of no less than about 2 inches that remain in the lower tubing stem to minimize wobble between the engaged tubing stems, no matter how far the foliage tiers are spaced from each other. Each tubing stem 18, 20 and 22 can be constructed of PVC tubing with various lengths. For example, the top tubing stem 18 can be constructed with a length of about 21 inches; the middle tubing stem 20 can be constructed with a length of about 24 inches; and the bottom tubular stem 22 can be constructed with a length of about 24 inches. When the tubing stems are fully extended, the overall height may be about 70 inches. Preferably, and in the preferred embodiment, these tubing stem lengths can vary plus or minus three inches. Of course, those skilled in the art may find many other lengths are suitable.

The PVC tubing stems 18, 20, and 22 can be painted with a color that resembles the stems of plants that constitute the topiary, such as brown. Moreover, the tubing stems can be multicolored to better resemble stems, bark, etc., that are part of the topiary arrangement 10. Indeed, an upper portion of the tubing stems can be constructed or molded to resemble a spiral stem to more accurately resemble the topiary plant. The bottom parts of the stems would be linear so as to be telescopic within the underlying tubing stem.

It should be noted that when the foliage tiers 16, 14 and 12 are pushed down into a compact position for storage or shipping, the user need not reposition the O-rings on their respective tubing stems, as the O-rings will be automatically moved upwardly on their stems. An advantage to the use of elastomer O-rings, the weather and moisture will not corrode the elastomeric material, should the topiary arrangement 10 be located outside in the weather. Moreover, should an O-ring break, it can be easily replaced as the O-rings are of conventional construction and are easily available.

Figure 5:
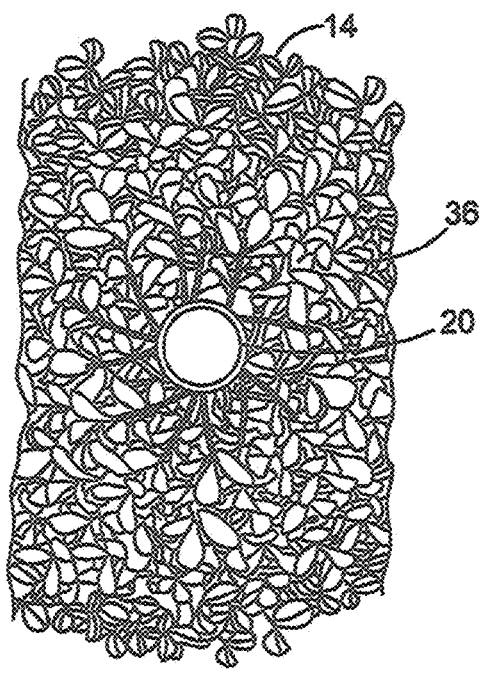
FIG. 5 is a partial top view of a foliage tier, illustrating the tubular stem embedded therein.

In the preferred embodiment, each foliage tier, such as middle foliage tier 14 illustrated in FIG. 5, is fabricated with the tubular stem 20 embedded within the surrounding foliage 36, from top to bottom. In the preferred embodiment, the foliage 36 constitutes small plastic leaves and plastic leaf stems formed with an outer spherical surface. The leaves and leaf stems are adhered or otherwise bonded to the top portion of the tubular stem 20. Thus, the foliage 36 is made integral with the tubular stem 20. The other foliage tiers are fabricated in a similar manner. The foliage can be molded to resemble a leafy type of foliage, while many other types of foliage, even flowers, can be utilized with the topiary arrangement of the invention.

Figure 6:
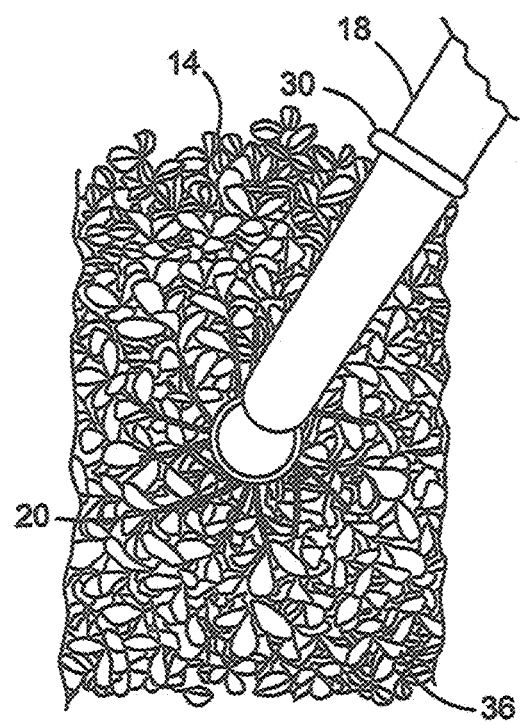
FIG. 6 is a partial top view of the foliage tier of FIG. 5, illustrating the insertion of a tubular stem therein.
Figure 7:
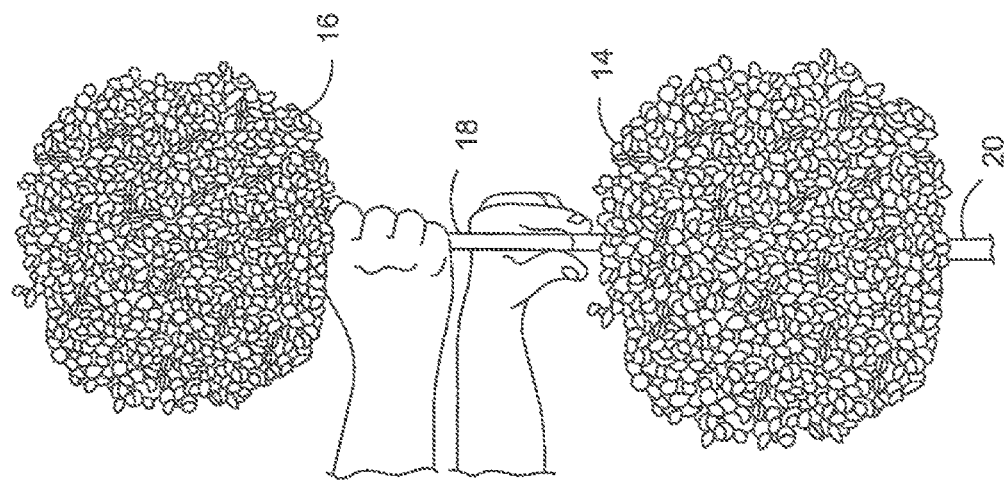
FIG. 7 is a side view of the assembly of the top foliage tier to the middle foliage tier.

With reference to FIG. 6, there is illustrated the assembly step of inserting the top foliage tier stem 18 into the underlying tubing stem 20 of the middle foliage tier 14. The tubing stem 18 of the top foliage tier 16 is inserted into the underlying tubing stem 20 until stopped by the O-ring 30. This is illustrated in FIG. 7. The O-ring 30 can be adjusted at any time to achieve the desired distance between the top tier 16 and the middle tier 14.

Figure 8:
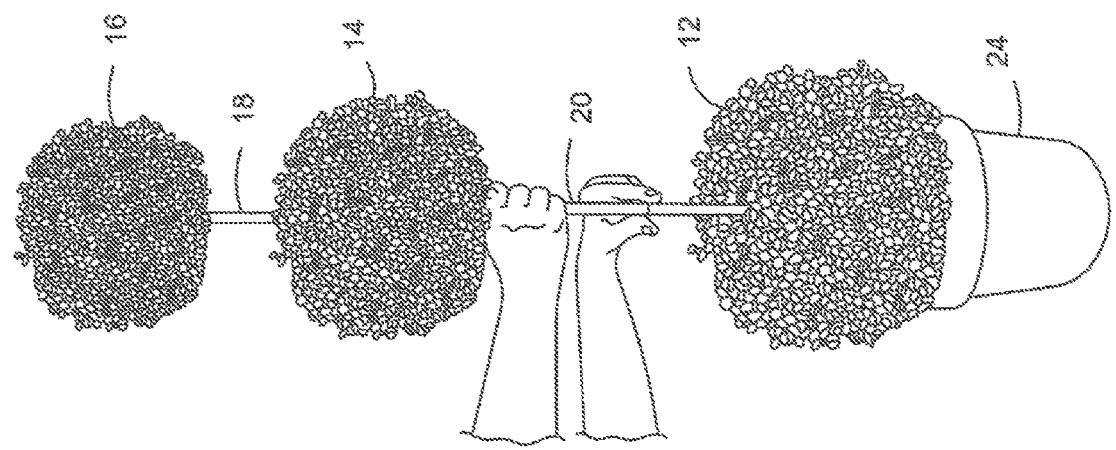
FIG. 8 is a side view of the assembly of the top and middle foliage tiers to the bottom foliage tier.

In the continued assembly of the topiary arrangement 10, the bottom tier 12 is assembled by inserting the associated tubing stem 22 (FIG. 3) into the base tubing receptacle 26 that is anchored in the urn 24. The base tubing receptacle 26 is anchored in the urn 24 by fastening a wooden plate, or the like, to the bottom portion of the base tubing receptacle 26 and placing the same in the bottom of the urn 24. Next, a heavy material, such a concrete, is poured over the wooden plate to fix the bottom of the tubing receptacle 26 in the bottom of the urn 24. The concrete is allowed to cure so that the components are fixed within the urn 24. Next, the tubing stem 22 of the bottom tier 12 is inserted into the base tubing receptacle 26 until bottomed out by the O-ring 32. Lastly, and as illustrated in FIG. 8, the middle tubing stem 20 of the middle tier 14 is inserted into the top opening of the bottom tubing stem 22 until bottomed out by the associated O-ring 30.

The bottom tubing stem 22 is larger in diameter than the overlying tubing stem 20, due to the telescopic connection therebetween. Similarly, the middle tubing stem 20 is larger in diameter than the overlying tubing stem 18, also due to the telescopic connection therebetween. Accordingly, the diameters of the tubing stems as they progress upwardly become smaller. This coincides with the natural diameter of a plant stem, namely, the stem becomes smaller as it progresses from the bottom of the plant to the top of the plant. Thus, the telescopic tubing stems appear like live stems as to the stem diameter.

As set forth above, the various tiers are interconnected with tubular members that are telescopic with respect to neighbor tubular members. As such, any tier can be rotated about its telescopic connection so as to change the direction of appearance thereof. The topiary decorative items can thus have different appearances, as between the front thereof and the back, whereby the topiary arrangement can change appearances by simply rotating the individual tiers. While the preferred embodiment is described in connection with tubing stems, those skilled in the art may prefer to utilize stems of rectangular cross sections that are telescopic, whereby rotation of the tiers is not possible. However, in this latter arrangement, the bottommost telescopic connection can be constructed with circular (cross section) tubes so as to be rotatable and all of the tiers are rotated in unison.

While the topiary arrangement 10 of the preferred embodiment includes three sections, those skilled in the art may prefer to utilize a different number of sections, including one, two, four, etc. If a single topiary tier is desired, then in FIG. 3, the upper topiary tiers 14 and 16 can be eliminated, as well as the corresponding telescopic connections 18 and 20. From this, it is apparent how to construct a topiary arrangement with only two foliage tiers 12 and 14. Moreover, the topiary arrangement need not resemble a decorative plant or foliage, but can include other decorative shapes, including animals, vehicles, toys, geometric shapes, etc.

While the preferred and other embodiments of the invention have been disclosed with reference to specific topiary components, and associated methods of fabrication thereof, it is to be understood that many changes in detail may be made as a matter of engineering or design choices without departing from the spirit and scope of the invention, as defined by the appended claims.

What is claimed is:

1. A topiary arrangement, comprising:
a first and a second vertical tier, where said tiers include respective first and second decorative items;
a base for supporting the vertical tiers;
said first der having a first tubular member with a first diameter, said first tubular member includes a top end with an edge, and said first tubular member attached to said first decorative item;
a second tier having a second tubular member with a diameter that is different from the diameter of said first tubular member so that said first and second tubular members are telescopic in length, said second tubular member having a top end with an edge;
an O-ring that tightly engages around the tubular member with a smaller diameter, said O-ring for engaging the edge of the tubular member with a larger diameter, said O-ring for limiting telescopic movement between said first and second tubular members.

2. The topiary arrangement of claim 1, further including a telescopic connection between a bottom said tier and said base.

3. The topiary arrangement of claim 1, wherein said decorative item comprises plant foliage.

4. The topiary arrangement of claim 1, wherein a distance between tiers is adjustable by adjusting a position of said O-ring on the smaller diameter tubular member.

5. The topiary arrangement of claim 1, wherein a first said tier can be moved downwardly into contact with a second said tier by moving said O-ring upwardly on the smaller diameter tubular member.

6. The topiary arrangement of claim 1, wherein each said tier is rotatable about a respective telescopic connection.

7. The topiary arrangement of claim 1, wherein said base is weighted so that said tiers do not fall over due to a wind.

8. The topiary arrangement of claim 1, wherein the decorative item of each said tier is adhered to a top portion of a respective tubular member to which the decorative item is associated.

9. The topiary arrangement of claim 1, wherein a topmost said tier has a cap covering a top end thereof.

10. The topiary arrangement of claim 1, wherein said O-ring is tightly stretched around the smaller diameter tubular member, but can be moved longitudinally along said smaller diameter tubular member.

11. The topiary arrangement of claim 1, wherein said first tier is a bottom tier and said second tier overlies said first tier, and said second tier decorative item is attached to the smaller diameter tubular member, and said first tier decorative item is attached to the larger diameter tubular member.

12. The topiary arrangement of claim 1, wherein the second vertical tier is adjustable to an infinite number of distances from said first vertical tier.

13. The topiary arrangement of claim 1, wherein said second vertical tier can be removed from said first vertical tier by pulling upwardly on said second vertical tier.

14. The topiary arrangement of claim 1, wherein said first and second tubular members are circular in cross section.

15. The topiary arrangement of claim 1, wherein the said first and second tubular members are of different diameters, with a smaller diameter tubular member being inserted into the larger diameter tubular member from a top of the large diameter tubular member, whereby the tubular members are smaller in diameter as they are located further from the base, similar to stems of a plant as it grows taller.

16. The topiary arrangement of claim 1, wherein said tubular members form respective stems of topiary plants, and said tubular members are colored to resemble a color of the stems of plants forming said topiary arrangement.

* * * * *